US009520778B2

(12) United States Patent
Jiang et al.

(10) Patent No.: US 9,520,778 B2
(45) Date of Patent: Dec. 13, 2016

(54) CONSTANT ON-TIME SWITCHING CONVERTERS WITH ULTRASONIC MODE DETERMINATION CIRCUIT AND CONTROL METHODS THEREOF

(71) Applicant: Chengdu Monolithic Power Systems Co., Ltd., Chengdu (CN)

(72) Inventors: Lijie Jiang, Hangzhou (CN); Chia-Hsin Chang, Santa Clara, CA (US); Wenbin Lu, Hangzhou (CN); Wangmiao Hu, Hangzhou (CN); Qian Ouyang, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/586,859

(22) Filed: Dec. 30, 2014

(65) Prior Publication Data

US 2015/0188433 A1   Jul. 2, 2015

(30) Foreign Application Priority Data

Dec. 30, 2013   (CN) .......................... 2013 1 0745780

(51) Int. Cl.
*H02M 3/158* (2006.01)
*H02M 3/156* (2006.01)
*H02M 1/00* (2006.01)

(52) U.S. Cl.
CPC ............. *H02M 3/156* (2013.01); *H02M 3/158* (2013.01); *H02M 2001/0032* (2013.01); *Y02B 70/16* (2013.01)

(58) Field of Classification Search
CPC ................................................... H02M 3/158

USPC .................................................. 323/271, 284
See application file for complete search history.

(56) References Cited

U.S. PATENT DOCUMENTS

| | | | | |
|---|---|---|---|---|
| 2009/0080227 A1* | 3/2009 | Nakahashi | ............ | H02M 3/156 363/80 |
| 2010/0033215 A1* | 2/2010 | Fogg | ........................ | H03K 4/50 327/137 |
| 2010/0301827 A1* | 12/2010 | Chen | ...................... | H02M 3/156 323/299 |
| 2011/0101932 A1* | 5/2011 | Nakazono | ........... | H02M 3/1588 323/271 |
| 2011/0227549 A1* | 9/2011 | Huang | ................ | H02M 3/1588 323/282 |
| 2013/0106374 A1* | 5/2013 | Ball | .................... | H02M 3/1588 323/271 |
| 2014/0035654 A1 | 2/2014 | Jiang et al. | | |
| 2014/0084885 A1 | 3/2014 | Ouyang | | |
| 2014/0160601 A1 | 6/2014 | Ouyang | | |

(Continued)

*Primary Examiner* — Matthew Nguyen
*Assistant Examiner* — Trinh Dang

(57) ABSTRACT

A control method used in a constant on-time switching converter includes: judging whether the switching converter enters into an ultrasonic mode; turning ON the low-side switch to discharge the output capacitor when the switching converter enters into the ultrasonic mode; generating an additional slope compensation signal during the discharge of the output capacitor; comparing a feedback signal indicative of the output voltage of the switching circuit with the sum of a reference voltage and the additional slope compensation signal; turning OFF the low-side switch and turning ON the high-side switch when the feedback signal decreases to reach the sum of the reference voltage and the additional slope compensation signal.

19 Claims, 6 Drawing Sheets

(56) References Cited

U.S. PATENT DOCUMENTS

2015/0028830 A1* 1/2015 Chen .................... H02M 3/158
                                                    323/271
2015/0091544 A1* 4/2015 Jayaraj ................. H02M 3/156
                                                    323/284

* cited by examiner

1

CONSTANT ON-TIME SWITCHING CONVERTERS WITH ULTRASONIC MODE DETERMINATION CIRCUIT AND CONTROL METHODS THEREOF

CROSS-REFERENCE TO RELATED APPLICATION(S)

This application claims the benefit of CN application 201310745780.8, filed on Dec. 30, 2013, and incorporated herein by reference.

TECHNICAL FIELD

The present invention generally relates to electronic circuits, and more particularly, relates to constant on-time switching converters and control methods thereof.

BACKGROUND

Constant on-time control is widely used in power supply area because of its good transient response, simple structure and smooth mode transition. FIG. 1 illustrates a prior art constant on-time switching converter 100. The switching converter 100 comprises an on-time control circuit 101, a comparison circuit 102, a logic circuit 103, a switching circuit 104 and a slope compensation circuit 105. The switching circuit 104 is configured in a synchronous Buck topology. It comprises a high-side switch HS, a low-side switch LS, an inductor L and an output capacitor C. The common node of the high-side switch HS and the low-side switch LS is the switching node SW. The switching circuit 104 is configured to convert an input voltage $V_{in}$ into an output voltage $U_{out}$. When the equivalent serial resistance (ESR) of the output capacitor C is small, sub-harmonic oscillation of the output voltage $U_{out}$ may occur and cause instability of the switching converter 100. The slope compensation circuit 105 is used to generate a slope compensation signal $V_{slope}$ to prevent oscillation. A comparison circuit 102 compares the output voltage $U_{out}$ of the switching circuit 104 with a reference signal $U_{ref}$ and generates a comparison signal SET based on the comparison result. The reference signal $U_{ref}$ is the sum of a reference voltage $V_{ref}$ and the slope compensation signal $V_{slope}$. The logic circuit 103 is coupled to the output terminal of the on-time control circuit 101 to receive an on-time control signal COT, and is coupled to the comparison circuit 102 to receive the comparison signal SET, the logic circuit 103 is configured to generate a high-side control signal HCTRL for controlling the high-side switch HS and a low-side control signal LCTRL for controlling the low-side switch LS based on the on-time control signal COT and the comparison signal SET.

In order to eliminate the audible noise of the switching converter 100 in light load, the switching converter 100 further comprises an ultrasonic mode determination circuit 106 configured to judge whether the switching converter 100 enters into an ultrasonic mode (USM). Usually, when the switching frequency of the switching circuit 104 approaches an audible range (such as 20 Hz-20 kHz), the switching converter 100 enters into the ultrasonic mode. However, there are double ON pulses in the ultrasonic mode as shown in FIG. 2.

FIG. 2 illustrates a schematic waveform diagram of the switching converter 100 shown in FIG. 1 in the ultrasonic mode, wherein $I_L$ represents the current flowing through the inductor L.

As shown in FIG. 2, at time $t_1$, the switching converter 100 enters into the ultrasonic mode, which is detected by the ultrasonic mode determination circuit 106. The logic circuit 103 turns ON the low-side switch LS to discharge the output capacitor C until the output voltage $U_{out}$ decreases to reach the reference signal $U_{ref}$ at time $t_2$, then the low-side switch LS is turned OFF and the high-side switch HS is turned ON.

At time $t_3$, when the on-time of the high-side switch HS is over, the on-time control signal COT generated by the on-time control circuit 101 turns OFF the high-side switch HS. The output voltage $U_{out}$ reduces to a lower value $V_{o\_low}$, which is smaller than the steady state output voltage $\bar{V}_{out}$. The output voltage $U_{out}$ is very likely and easy to decrease to reach the reference signal $U_{ref}$ again. This may cause the high-side switch HS to be turned ON again. As shown in FIG. 2, the high-side switch HS is turned ON again at time $t_4$. The output voltage $U_{out}$ at time $t_5$ will be charged to a higher value $V_{o\_high}$, which is larger than the steady state output voltage $\bar{V}_{out}$.

As shown in FIG. 2, in the ultrasonic mode, the high-side control signal HCTRL has two on pulses in one switching cycle of the switching converter 100. Thus there are also double pulses at the switching node SW, which leads to a large ripple of the output voltage $U_{out}$ and reduces the efficiency of the switching converter 100.

SUMMARY

The embodiments of the present invention are directed to a constant on-time switching converter comprising a switching circuit, an on-time control circuit, an ultrasonic mode determination circuit, a slope compensation module, a comparison circuit and a logic circuit. The switching circuit has a high-side switch, a low-side switch, an inductor and an output capacitor connected in parallel with a load. The switching circuit is configured to convert an input voltage into an output voltage to the load. The on-time control circuit is configured to generate an on-time control signal which is used to control the on-time of the high-side switch. The ultrasonic mode determination circuit is configured to provide a flag signal indicating whether the switching converter enters into an ultrasonic mode. The slope compensation module is coupled to the ultrasonic mode determination circuit to receive the flag signal and configured to generate a slope compensation signal based the flag signal. The comparison circuit is coupled to the slope compensation module and the switching circuit, wherein the comparison circuit compares a feedback signal indicative of the output voltage of the switching circuit with a sum of a reference voltage and the slope compensation signal, and generates a comparison signal. The logic circuit is coupled respectively to the on-time control circuit, the comparison circuit and the ultrasonic mode determination circuit, wherein based on the on-time control signal, the comparison signal and the flag signal, the logic circuit generates a high-side control signal for controlling the high-side switch and a low-side control signal for controlling the low-side switch. When the switching converter enters into the ultrasonic mode, the low-side switch is turned ON by the logic circuit to discharge the output capacitor until the feedback signal decreases to reach a sum of a reference voltage and the slope compensation signal, and wherein the slope compensation signal has two parts: a normal slope compensation signal and an additional slope compensation signal, and the value of the additional slope compensation signal increases during the discharge of the output capacitor.

BRIEF DESCRIPTION OF THE DRAWINGS

Non-limiting and non-exhaustive embodiments are described with reference to the following drawings. The drawings are only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
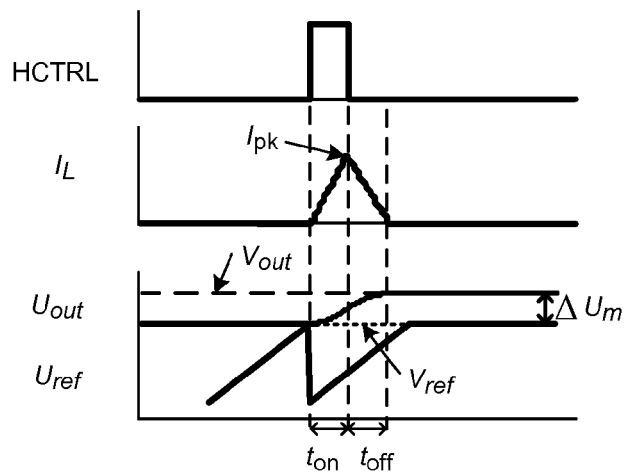
FIG. 3 illustrates a schematic waveform diagram of the switching converter 100 without entering into the ultrasonic mode.

FIG. 3 illustrates a schematic waveform diagram of the switching converter 100 without entering into an ultrasonic mode. As shown in FIG. 3, the switching converter does not enter into the ultrasonic mode, the low-side switch LS would not be turned OFF to discharge the output capacitor C. The on pulse of the high-side switch HS will be used only to charge the output capacitor C, and the output voltage $U_{out}$ is charged from the reference voltage $V_{ref}$ to the steady state output voltage $V_{out}$. The voltage difference between the steady state output voltage $V_{out}$ and the reference voltage $V_{ref}$ is normal voltage difference $\alpha U_m$. Based on the principle of volt-second balance and charge conservation law, equation (1) can be derived as such:

$$\begin{cases} C\Delta U_m = C(V_{out} - V_{ref}) = \frac{1}{2} I_{pk}(t_{on} + t_{off}) \\ I_{pk} = \frac{V_{in} - V_{out}}{L} t_{on} \\ t_{off} = \frac{V_{in} - V_{out}}{V_{out}} t_{on} \end{cases} \quad (1)$$

wherein L and C are respectively inductance value of the inductor L and capacitance value of the output capacitor C. Equation (2) illustrates the solving equation (1) for the normal voltage difference $\alpha U_m$:

$$\Delta U_m = \frac{(V_{in} - V_{out}) t_{on}^2 V_{in}}{2LCV_{out}} \quad (2)$$

Figure 4:
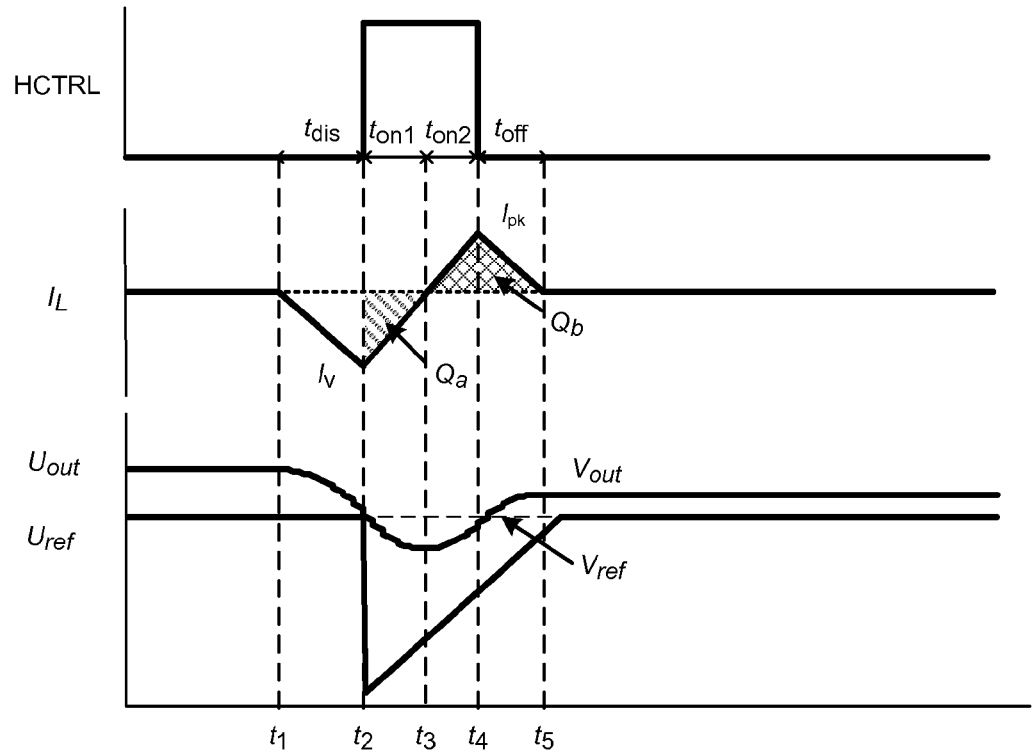
FIG. 4 illustrates a schematic waveform diagram of the switching converter 100 in critical condition of the ultrasonic mode where no double pluses happen.

FIG. 4 illustrates a schematic waveform diagram of the switching converter 100 in critical condition of the ultrasonic mode where no double on pluses happen. As shown in FIG. 4, the switching converter 100 enters into the ultrasonic mode, from $t_1$ to $t_2$, the low-side switch LS is turned ON to discharge the output capacitor C. In the meantime, the output voltage $U_{out}$ decreases continually until it equals to the reference voltage $V_{ref}$. At time $t_2$, the inductor current $I_L$ reduced to a valley $I_V$. According to the discharge process of the output capacitor C, equation (3) can be written:

$$\begin{cases} C\frac{dU_{out}(t)}{dt} = i_L(t) = -\frac{V_{out}}{L} t \\ U_{out}(0) = V_{out} \\ U_{out}(t_{dis}) = V_{ref} \end{cases} \quad (3)$$

In equation (3), $t_{dis}$ is defined as the discharge time of the low-side switch LS, i.e. $t_{dis}=t_2-t_1$. Based on the above relationship, the discharge time $t_{dis}$ of the low-side switch LS can be given by equation (4):

$$t_{dis} = \sqrt{2\left(1 - \frac{V_{ref}}{V_{out}}\right)LC} \quad (4)$$

At time $t_2$, the valley $I_V$ of the inductor current $I_L$ can be expressed as set forth in equation (5):

$$I_V = \frac{V_{out}}{L} t_{dis} \quad (5)$$

Next, the output capacitor C is charged by using an on pulse.

In the period from $t_2$ to $t_3$, the inductor current $I_L$ increases from the valley $I_V$ to 0, this period is called as a first on-time $t_{on1}$ of the high-side switch HS. In the period from $t_3$ to $t_4$, the inductor current $I_L$ increases from 0 to a peak $I_{PK}$, and the period is called as a second on-time $t_{on2}$ of the high-side switch HS. Thus the relationship between the on-time $t_{on}$ of the high-side switch HS, $t_{on1}$ and $t_{on2}$ can expressed as $t_{on}=t_{on1}+t_{on2}$. Where the first on-time $t_{on1}$ of the high-side switch HS can be expressed as set forth in equation (6):

$$t_{on1} = \frac{LI_V}{(V_{in} - V_{out})} \quad (6)$$

In the period from $t_4$-$t_5$, the inductor current $I_L$ decreases from the peak $I_{PK}$ to 0, this period is called as free-wheeling time $t_{off}$ of the low-side switch LS.

As shown in FIG. 4, if the charged quantity of electricity $Q_b$ is larger than the charged quantity of electricity $Q_a$, that is the output voltage $U_{out}$ is larger than the reference voltage $V_{ref}$ at time $t_5$, double pulses would not happen, so equation (7) can be derived:

$$\begin{cases} \frac{1}{2} I_V t_{on1} < \frac{1}{2} I_{pk}(t_{on2} + t_{off}) \\ I_{pk} = \frac{I_V}{t_{on1}} t_{on2} \\ t_{off} = \frac{(V_{in} - V_{out})}{V_{out}} t_{on2} \end{cases} \quad (7)$$

from equation (7), $$t_{on1}\sqrt{\frac{V_{out}}{V_{in}}} < t_{on2} \quad (8)$$

or $$t_{dis}\sqrt{\frac{V_{out}}{V_{in}}} < t_{off}$$

It can be seen, if either the relationship between the first on-time $t_{on1}$ and the second on-time $t_{on2}$ of the high-side switch HS or the relationship between the discharge time $t_{dis}$ of the low-side switch LS the free-wheeling time $t_{off}$ of the low-side switch LS meets equation (8), the double pulses of the switching converter in the ultrasonic mode would not happen. Unfortunately, normal design parameters are hard to meet equation (8).

Figure 5:
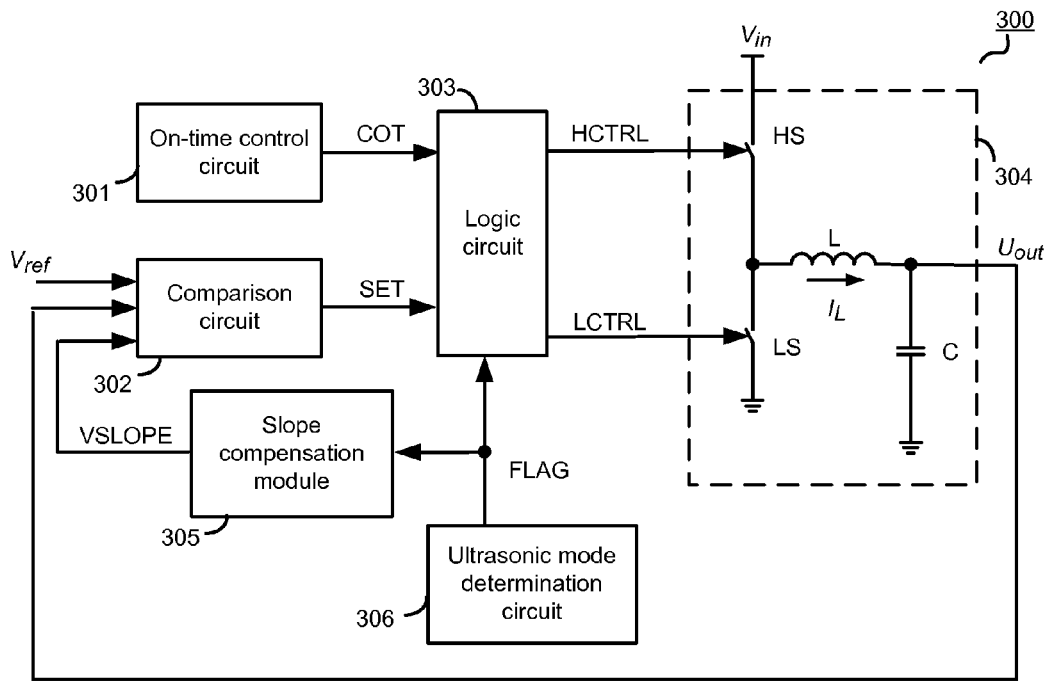
FIG. 5 illustrates a schematic circuitry diagram of a constant on-time switching converter 300, in accordance with an embodiment of the present invention.

FIG. 5 illustrates a schematic circuitry diagram of a constant on-time switching converter 300 according to an embodiment of the present invention, and the switching converter 300 comprises a controller and a switching circuit 304. In the embodiment shown in FIG. 5, the switching circuit 304 is configured in a synchronous Buck topology. It comprises a high-side switch HS, a low-side switch LS, an inductor L and an output capacitor C. The switching circuit 304 is configured to convert an input voltage $V_{in}$ into an output voltage $U_{out}$ by controlling the switches HS and LS. The high-side switch HS has a first terminal, a second terminal and a control terminal, wherein the first terminal is configured to receive the input voltage $V_{in}$. The low-side switch LS has a first terminal, a second terminal and a control terminal, wherein the first terminal is coupled to the second terminal of the high-side switch HS, the second terminal is grounded. The inductor L has a first terminal and a second terminal, wherein the first terminal is coupled to the second terminal of the high-side switch HS and the first terminal of the low-side switch LS. The output capacitor C is connected in parallel with the load (not shown) and is coupled between the second terminal of the inductor L and ground. The high-side switch HS and the low-side switch LS in the switching circuit 103 may be any controllable semiconductor devices, such as MOSFET, IGBT, and so on.

In the embodiment of FIG. 5, the controller comprises an on-time control circuit 301, a comparison circuit 302, a logic circuit 303, a slope compensation module 305 and an ultrasonic mode determination circuit 306. The on-time control circuit 301 is configured to generate an on-time control signal COT which is used to control the on-time $t_{on}$ of the high-side switch HS. The ultrasonic mode determination circuit 306 is configured to judge whether the switching converter 300 enters into the ultrasonic mode, and to generate a flag signal FLAG. There are many ways that can be used to judge whether the switching converter 300 enters into the ultrasonic mode. For example, the current switching cycle may be compared with a predetermined cycle. If the current switching cycle is larger than the predetermined cycle, or the current switching cycle is continuously larger than the predetermined cycle in a predetermined time period, the switching converter 300 will be deemed as entering into the ultrasonic mode. In other embodiment, the detection of the current switching cycle may be realized by sensing the switching frequency of a high-side control signal HCTRL for controlling the high-side switch HS, or be realized by other suitable means.

In the embodiment of FIG. 5, the slope compensation module 305 is coupled to the ultrasonic mode determination circuit 306 to receive the flag signal FLAG and generate a slope compensation signal VSLOPE. The comparison circuit 302 is coupled to the slope compensation module 305 and the switching circuit 304. The comparison circuit 302 is configured to generate a comparison signal SET based on the slope compensation signal VSLOPE, a reference voltage $V_{ref}$ and the output voltage $U_{out}$. In another embodiment, the switching converter 300 further comprises a feedback circuit. The feedback circuit is configured to sample the output voltage $U_{out}$ and to generate a feedback signal indicative of the output voltage $U_{out}$ to the switching circuit 304.

The logic circuit 303 is coupled to the on-time control circuit 301, the comparison circuit 302 and the ultrasonic mode determination circuit 306, and is configured to generate the high-side control signal HCTRL for controlling the high-side switch HS and a low-side control signal LCTRL for controlling the low-side switch LS respectively, based on the on-time control signal COT, the comparison signal SET and the flag signal FLAG.

Figure 1:
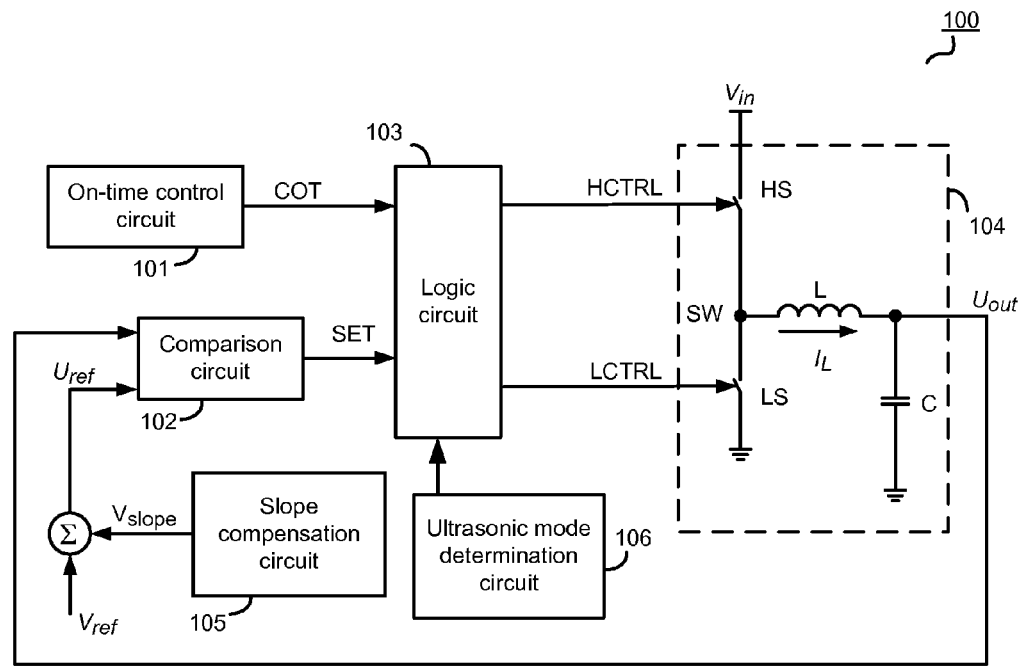
FIG. 1 illustrates a prior art constant on-time switching converter 100.
Figure 2:
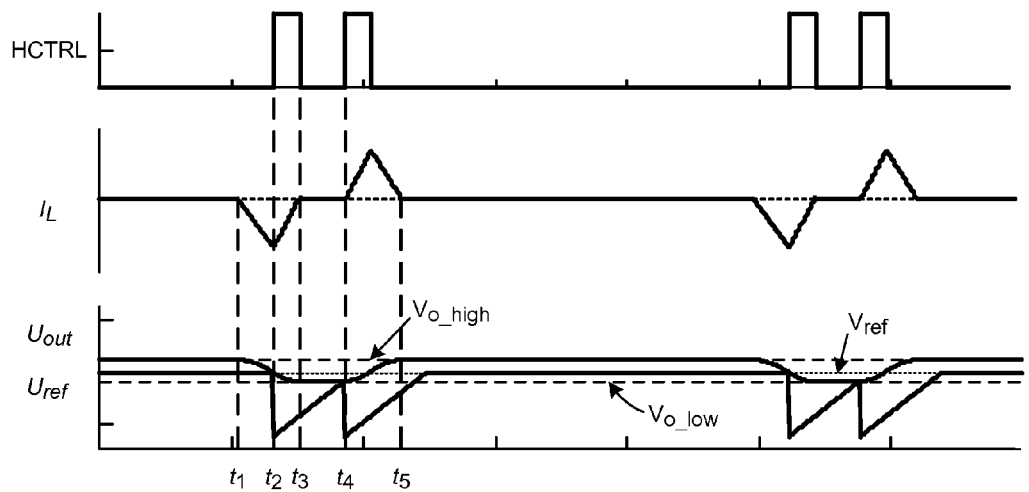
FIG. 2 illustrates a schematic waveform diagram of the switching converter 100 shown in FIG. 1, in the ultrasonic mode.

In one embodiment, when the switching converter 300 is not in the ultrasonic mode, the flag signal FLAG is low level. At this time the slope compensation module 305 is configured to generate a slope compensation signal VSLOPE to prevent oscillation and operates generally similarly as the slope compensation circuit 105 shown in FIG. 1. When the switching converter 300 enters into the ultrasonic mode, the logic circuit 303 turns ON the low-side switch LS to discharge the output capacitor C until the comparison signal SET used to turn ON the high-side switch HS is seen at the output of the comparison circuit 302. In the meantime, the flag signal FLAG is high level, the slope compensation module 305 is configured to generate the slope compensation signal VSLOPE which has two parts: a normal slope compensation signal $V_{slope1}$ and an additional slope compensation signal $V_{slope2}$. Where the normal slope compensation signal $V_{slope1}$ is used to prevent oscillation, just like the slope compensation signal $V_{slope}$ in FIG. 1. Since the function of the normal slope compensation signal $V_{slope1}$ is similar to that of the slope compensation signal $V_{slope}$ shown in FIG. 1, the generating principle of the normal slope compensation signal $V_{slope1}$ is omitted for clarity. And the additional slope compensation signal $V_{slope2}$ is configured to eliminate the double pulses in the ultrasonic mode of the switching converter 300, which is generated only during the discharging of the low-side switch LS. In one embodiment, the value of the additional slope compensation signal $V_{slope2}$ increases from an initial voltage $V_{ori}$ with a constant rate α. In an embodiment, the initial voltage $V_{ori}$ is 0. In other embodiment, the additional slope compensation signal $V_{slope2}$ increases from the initial voltage $V_{ori}$ with variable rates, for example, the relationship between the additional slope compensation signal $V_{slope2}$ and time could be non-linear in nature or could be a piecewise linear characteristic.

According to the embodiment of the present invention, the high-side switch HS is turned ON in advance by using the additional slope compensation signal. This shortens the discharge time of the low-side switch LS, eliminates the double pulses in the ultrasonic mode, significantly reduces the ripple of the output voltage of the switching circuit over the prior art. Additionally, the switching loss of the switching converter is reduced and the efficiency is improved. An operation of the embodiment according to this prevention will be described below with reference to FIG. 6.

Figure 6:
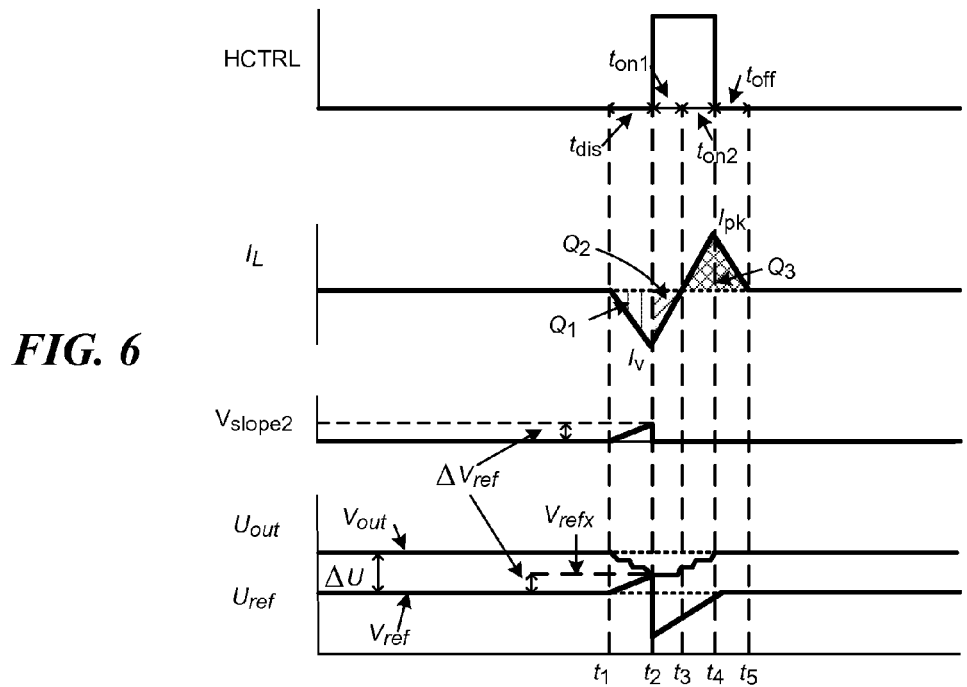
FIG. 6 illustrates a schematic waveform diagram of the switching converter 300 shown in FIG. 5 in the ultrasonic mode, in accordance with an embodiment of the present invention.

FIG. 6 illustrates a schematic waveform diagram of the switching converter 300 shown in FIG. 5 in ultrasonic mode, in accordance with an embodiment of the present invention. As shown in FIG. 4, at time $t_2$, the low-side switch LS is turned OFF and the discharging ends when the output voltage $U_{out}$ decreases to the reference voltage $V_{ref}$. In the embodiment shown in FIG. 6, the slope compensation module 305 further provides the additional slope compensation signal $V_{slope2}$ during the discharging of the low-side switch LS. The additional slope compensation signal $V_{slope2}$ is a signal that, when the low-side switch LS is turned ON to discharge the output capacitor C at time $t_1$, the value of the additional slope compensation signal $V_{slope2}$ increases from the initial voltage $V_{ori}$ (such as 0) with a constant rate α during the discharging of the low-side switch LS. At time $t_2$, the low-side switch LS is turned OFF and the discharging ends when the output voltage $U_{out}$ decreases to the sum of the additional slope compensation signal $V_{slope2}$ and the reference voltage $V_{ref}$. Comparing with FIG. 4, the low-side switch LS is turned OFF in advance by using the additional slope compensation signal $V_{slope2}$. This shortens the discharge time of the low-side switch LS, and can eliminate the double pulses in the ultrasonic mode. As shown in FIG. 6, the value of the additional slope compensation signal $V_{slope2}$ is zero except during the discharging of the low-side switch LS. The additional slope compensation signal $V_{slope2}$, the normal slope compensation signal $V_{slope1}$ together are added to the reference voltage $V_{ref}$ to form an improved reference signal $U_{ref}$.

The value of the improved reference signal $U_{ref}$ at time $t_2$ is defined as $V_{refx}$, at this time, the output voltage $U_{out}$ equals to the reference signal $U_{ref}$. The amplitude of the additional slope compensation signal $V_{slope2}$ can be expressed as: $\Delta V_{ref} = V_{refx} - V_{ref}$. According to the previous discussion, the output voltage $U_{out}$ at time $t_5$ should be larger than the reference voltage $V_{ref}$ to eliminate the double pulses, so:

$$\begin{cases} CV_{refx} - Q_2 + Q_3 > CV_{ref} & (9) \\ Q_2 = \frac{1}{2} I_V t_{on1} \\ Q_3 = \frac{1}{2} I_{pk}(t_{on2} + t_{off}) = \frac{1}{2} I_V \frac{t_{on2}^2}{t_{on1}} \frac{V_{in}}{V_{out}} \end{cases}$$

According to equations (4)~(6) and (9), equation (10) can be derived. Wherein before discharging of the low-side switch LS, the voltage difference between the output voltage $U_{out}$ and the reference voltage $V_{ref}$ is defined to the pre-discharging voltage difference ΔU.

$$\begin{cases} C\Delta V_{ref} > \frac{V_{out} t_{dis}}{2L}\left(t_{on1} - \frac{t_{on2}^2}{t_{on1}} \frac{V_{in}}{V_{out}}\right) & (10) \\ t_{dis} = \sqrt{2\left(\frac{\Delta U - \Delta V_{ref}}{V_{out}}\right) LC} \\ t_{on1} = \frac{\sqrt{2V_{out}(\Delta U - \Delta V_{ref})LC}}{V_{in} - V_{out}} \end{cases}$$

From equation (10), get $$\frac{2LC(V_{out}\Delta U - V_{in}\Delta V_{ref})}{(V_{in} - V_{out})^2} < t_{on2}^2 \frac{V_{in}}{V_{out}} \quad (11)$$

Now it is easy to find that if equation (11) is met, the double pulses in the ultrasonic mode of the switching converter can be eliminated. In order to convenient design, suppose that the left part of the above equation is smaller than 0, that is equation (12) can be met, equation (11) would be workable, accordingly double pulses in the ultrasonic mode can be eliminated.

$$\Delta V_{ref} > \Delta U \frac{V_{out}}{V_{in}} \quad (12)$$

Normally, pre-discharging voltage difference ΔU should not be larger than the normal voltage difference $\alpha U_m$ as previous described. In view of this, from equations (2) and (12), the minimum amplitude of the additional slope compensation signal $V_{slope2}$ can be expressed as below:

$$\Delta V_{ref(min)} = \frac{(V_{in} - V_{out})t_{on}^2}{2LC} \quad (13)$$

It can be concluded, when the amplitude of the additional slope compensation signal $V_{slope2}$ is larger than the minimum amplitude limited by equation (13), the double pulses in the ultrasonic mode can be eliminated.

One cycle steady state of the switching converter 300 in ultrasonic mode will be discussed below with reference to FIGS. 4 and 6. In one switching cycle, as shown in FIG. 4, the output voltage $U_{out}$ at time $t_1$ is larger than that at time $t_5$. But as shown in FIG. 6, the discharge time $t_{dis}$ of the low-side switch LS becomes short, the amplitude $\Delta V_{ref}$ of the additional slope compensation signal $V_{slope2}$ increases, the output voltage $U_{out}$ of the switching circuit will reach one cycle steady state shown in FIG. 6, that is, $U_{out}(t_1) = U_{out}(t_5)$ should be met. If the discharge time $t_{dis}$ of the low-side switch LS shortens still, the amplitude $\Delta V_{ref}$ of the additional slope compensation signal $V_{slope2}$ increases accordingly, the output voltage $U_{out}$ will rise in one cycle, that is, $U_{out}(t_1) < U_{out}(t_5)$.

In one cycle steady state shown in FIG. 6, the discharged quantity of electricity $(Q_1+Q_2)$ should be equal to the charged quantity of electricity $Q_3$. From equations (5)~(7), $$\begin{cases} Q_1 + Q_2 = \frac{1}{2} I_V (t_{dis} + t_{on1}) = \frac{V_{out} V_{in} t_{dis}^2}{2L(V_{in} - V_{out})} \\ Q_3 = \frac{1}{2} I_{pk} (t_{on2} + t_{off}) = \frac{(V_{in} - V_{out}) V_{in} (t_{on} - t_{on1})^2}{2L V_{out}} \end{cases} \quad (14)$$

According to equations (5)~(7) and (14) together, $$\begin{cases} t_{on} = \frac{2 V_{out} t_{dis}}{V_{in} - V_{out}} = 2 t_{on1} \\ t_{on1} = \frac{\sqrt{2 V_{out} (\Delta U - \Delta V_{ref}) LC}}{V_{in} - V_{out}} \end{cases} \quad (15)$$

From equation (15), the amplitude $\Delta V_{ref}$ of the additional slope compensation signal $V_{slope2}$ and the discharge time $t_{dis}$ can be expressed respectively:

$$\begin{cases} \Delta V_{ref} = \Delta U - \frac{[t_{on}(V_{in} - V_{out})]^2}{8LC V_{out}} \\ t_{dis} = \frac{(V_{in} - V_{out})}{V_{out}} \frac{t_{on}}{2} \end{cases} \quad (16)$$

It can be seen, these critical values that the switching converter 300 can achieve one cycle steady state are given by equation (16). If the amplitude $\Delta V_{ref}$ of the additional slope compensation signal $V_{slope2}$ is larger than the critical value limited by equation (16), or if the discharge time $t_{dis}$ of low-side switch LS is smaller than the critical value limited by equation (16), the output voltage $U_{out}$ will rise in one cycle. This makes the pre-discharging voltage difference $\Delta U$ increases, and significantly influences system stability.

In addition, according to the previous discussion, the pre-discharging voltage difference $\Delta U$ should not be larger than the normal voltage difference $\Delta U_m$, so the maximum value of the pre-discharging voltage difference $\Delta U$ should be set to the normal voltage difference $\alpha U_m$. From equations (2) and (16), the maximum amplitude of the additional slope compensation signal $V_{slope2}$ can be expressed as equation (17):

$$\Delta V_{ref(max)} = \frac{t_{on}^2 (V_{in} - V_{out})(3 V_{in} + V_{out})}{8 LC V_{out}} \quad (17)$$

In conclusion, when the amplitude $\Delta V_{ref}$ of the additional slope compensation signal $V_{slope2}$ meets the limitation shown in equation (18), not only the switching converter 300 can eliminate the double pulses in the ultrasonic mode, but also the output voltage $U_{out}$ will not rise in one switching cycle.

$$V_{ref} \leq \frac{(V_{in} - V_{out})(3 V_{in} + V_{out}) t_{on}^2}{8 LC V_{out}} \quad (18)$$

As shown in FIG. 6, the period from $t_1$ to $t_2$ is the discharging period of the low-side switch LS. In the meantime, the rate $\alpha$ of the additional slope compensation signal $V_{slope2}$ can be expressed as below:

$$\alpha = f(\Delta V_{ref}) = \frac{\Delta V_{ref}}{t_{dis}} \quad (19)$$

Since the discharge time $t_{dis}$ of the low-side switch LS meets without exception equation (20):

$$t_{dis(max)} < \frac{(V_{in} - V_{out}) t_{on}}{V_{out}} \quad (20)$$

From equations (13) and (20), the rate $\alpha$ of the additional slope compensation signal $V_{slope2}$ should meet:

$$\alpha > \frac{t_{on} V_{out}}{2LC} \quad (21)$$

According to the previous discussion, when the rate $\alpha$ of the additional slope compensation signal $V_{slope2}$ meets equation (21), the double pulses in the ultrasonic mode can be eliminated.

To prevent the output voltage $U_{out}$ of the switching circuit increases constantly in the ultrasonic mode, from equation (16), the minimum value of the discharge time $t_{dis}$ of the low-side switch LS should meet equation (22):

$$t_{dis(min)} = \frac{(V_{in} - V_{out})}{V_{out}} \frac{t_{on}}{2} \quad (22)$$

Otherwise, if the discharge time $t_{dis}$ of the low-side switch LS decreases constantly, the output voltage $U_{out}$ will rise and the pre-discharging voltage difference $\Delta U$ will increase accordingly. This influences system stability. To combine equations (17) and (22), the rate $\alpha$ of the additional slope compensation signal $V_{slope2}$ will meet:

$$\alpha \leq \frac{t_{on}(3 V_{in} - V_{out})}{4LC} \quad (23)$$

In conclusion, if the rate $\alpha$ of the additional slope compensation signal $V_{slope2}$ can meet equations (21) and (22) at the same time, the switching converter 300 not only can eliminate the double pulses, but also the output voltage will not rise.

Figure 7:
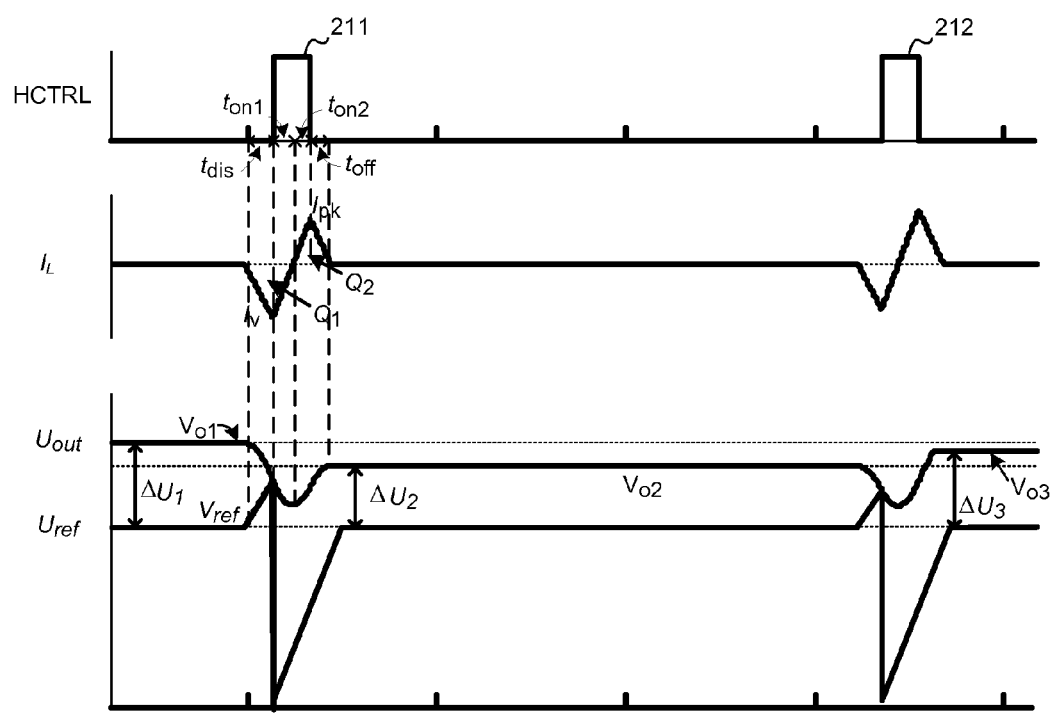
FIG. 7 illustrates a schematic waveform diagram of the switching converter 300 shown in FIG. 5 in the ultrasonic mode, in accordance with an embodiment of the present invention.

The convergent condition of the output voltage $U_{out}$ of the switching converter 300 in the ultrasonic mode will be discussed below with reference to FIG. 7. FIG. 7 illustrates a schematic waveform diagram of the switching converter 300 shown in FIG. 5 in ultrasonic mode, in accordance with an embodiment of the present invention. As shown in FIG. 7, before ON pulse 211 in the current switching cycle arrives, the output voltage $U_{out}$ generally remains at a first voltage $V_{o1}$. When ON pulse 211 ends, the output voltage $U_{out}$ generally remains at a second voltage $V_{o2}$. And after the ON pulse 212 ends in the next switching cycle, the output voltage $U_{out}$ generally remains at a third voltage $V_{o3}$.

According to the previous discussion, the relationship between the amplitude $\Delta V_{ref}$ and the rate $\alpha$ of the additional slope compensation signal $V_{slope2}$ can be expressed as equation (24):

$$\begin{cases} \Delta V_{ref} = \alpha t_{dis} \\ t_{dis} = \sqrt{2\left(\dfrac{\Delta U - \Delta V_{ref}}{V_{out}}\right)LC} \end{cases} \quad (24)$$

From the above equation, the discharge time $t_{dis}$ of the low-side switch LS can be expressed as equation (25):

$$t_{dis} = \dfrac{-\alpha + \sqrt{\alpha^2 + \dfrac{2\Delta U V_{out}}{LC}}}{\dfrac{V_{out}}{LC}} \quad (25)$$

According to the charge conservation law, equation (26) can be derived:

$$\begin{cases} C(V_{o1} - V_{o2}) = C(\Delta U_1 - \Delta U_2) = Q_1 - Q_2 \\ Q_1 = \dfrac{1}{2}I_V(t_{dis} + t_{on1}) = \dfrac{V_{out}V_{in}t_{dis}^2}{2L(V_{in} - V_{out})} \\ Q_2 = \dfrac{1}{2}I_{pk}(t_{on2} + t_{off}) = \dfrac{(V_{in} - V_{out})V_{in}(t_{on} - t_{on1})^2}{2LV_{out}} \\ t_{on1} = \dfrac{V_{out}}{V_{in} - V_{out}}t_{dis} \end{cases} \quad (26)$$

wherein $\Delta U_1$, $\Delta U_2$, $\Delta U_3$ are respectively the voltage differences between the first voltage $V_{o1}$ and the reference $V_{ref}$, between the second voltage $V_{o2}$ the reference $V_{ref}$, between the third voltage $V_{o3}$ and the reference $V_{ref}$. Combining equations (25) and (26), equations (27) and (28) can be written as such:

$$\Delta U_1 - \Delta U_2 = \dfrac{t_{on}V_{in}}{2V_{out}}\left[2\sqrt{\alpha^2 + \dfrac{2\Delta U_1 V_{out}}{LC}} - 2\alpha - \dfrac{(V_{in} - V_{out})t_{on}}{LC}\right] \quad (27)$$

$$\Delta U_2 - \Delta U_3 = \dfrac{t_{on}V_{in}}{2V_{out}}\left[2\sqrt{\alpha^2 + \dfrac{2\Delta U_2 V_{out}}{LC}} - 2\alpha - \dfrac{(V_{in} - V_{out})t_{on}}{LC}\right] \quad (28)$$

Adding equation (27) to (28), get $$\Delta U_1 - \Delta U_3 = \quad (29)$$

$$\dfrac{t_{on}V_{in}}{V_{out}}\left[\left(\sqrt{\alpha^2 + \dfrac{2\Delta U_1 V_{out}}{LC}} + \sqrt{\alpha^2 + \dfrac{2\Delta U_2 V_{out}}{LC}}\right) - 2\alpha - \dfrac{(V_{in} - V_{out})t_{on}}{LC}\right]$$

It can be seen if $\Delta U_1 > \Delta U_3$, the output voltage $U_{out}$ of the switching circuit is convergent and can converge to a stable value, so equation (30) should be satisfied.

$$\sqrt{\alpha^2 + \dfrac{2\Delta U_1 V_{out}}{LC}} + \sqrt{\alpha^2 + \dfrac{2\Delta U_2 V_{out}}{LC}} > 2\alpha + \dfrac{(V_{in} - V_{out})t_{on}}{LC} \quad (30)$$

From equation (27), $$2\alpha + \dfrac{(V_{in} - V_{out})t_{on}}{LC} = 2\sqrt{\alpha^2 + \dfrac{2\Delta U_1 V_{out}}{LC}} - \dfrac{2(\Delta U_1 - \Delta U_2)V_{out}}{t_{on}V_{in}}, \quad (31)$$

substituting equation (31) into equation (30), $$\sqrt{\alpha^2 + \dfrac{2\Delta U_1 V_{out}}{LC}} - \sqrt{\alpha^2 + \dfrac{2\Delta U_2 V_{out}}{LC}} < \dfrac{2(\Delta U_1 - \Delta U_2)V_{out}}{t_{on}V_{in}} \quad (32)$$

equation (32) can be rewritten by transforming as such:

$$\sqrt{\alpha^2 + \dfrac{2\Delta U_1 V_{out}}{LC}} - \sqrt{\alpha^2 + \dfrac{2\Delta U_2 V_{out}}{LC}} > \dfrac{t_{on}V_{in}}{LC} \quad (33)$$

From (33), it can be seen that if $$\alpha \geq \dfrac{t_{on}V_{in}}{2LC}, \quad (34)$$

then equation (33) will be workable. So in the ultrasonic mode, if the rate α of the additional slope compensation signal $V_{slope2}$ meets equation (34), the output voltage $U_{out}$ of the switching converter 300 is convergent, and can converge finally to stable state shown in FIG. 6.

Figure 8:
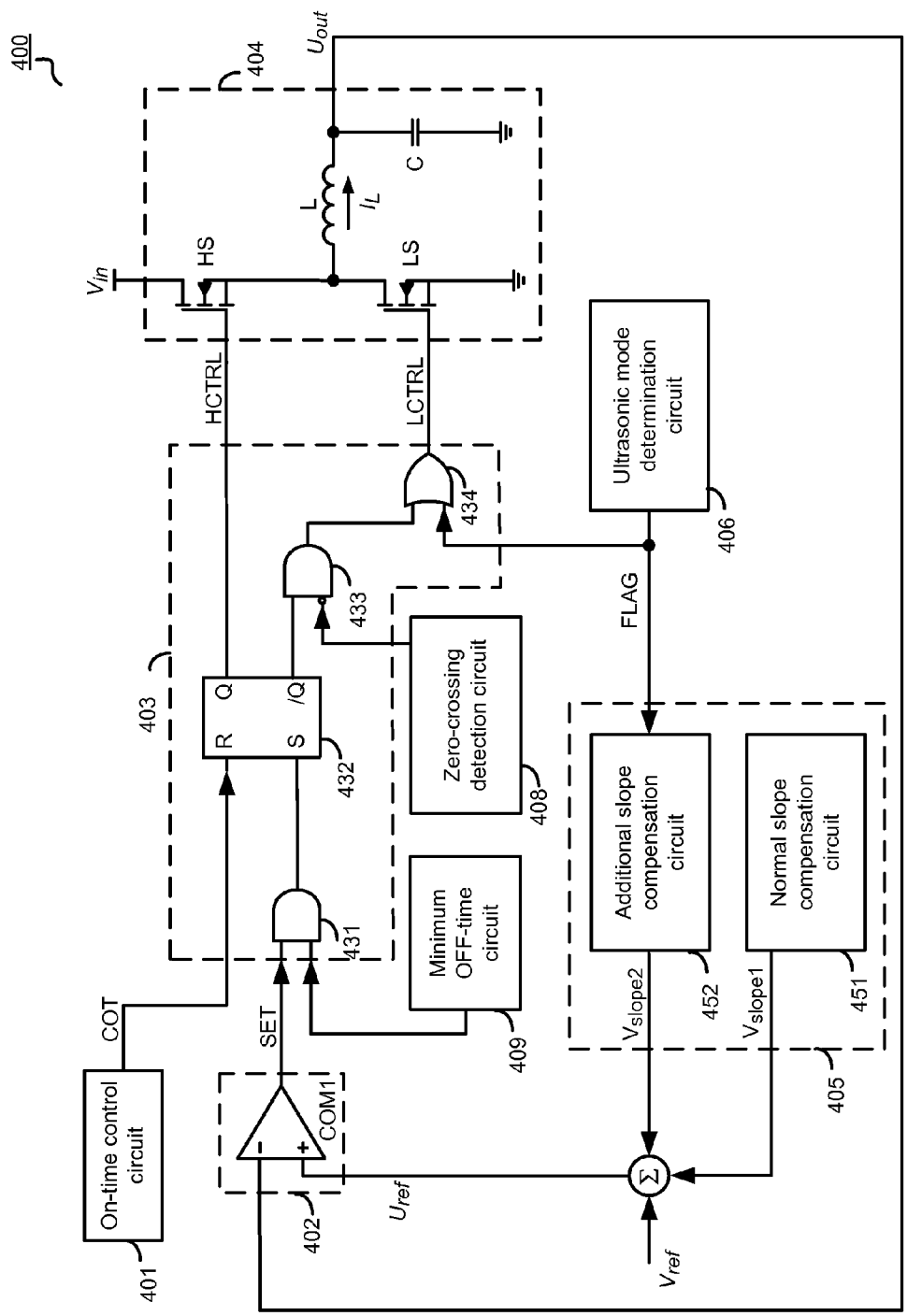
FIG. 8 illustrates a schematic circuitry diagram of a constant on-time switching converter 400, in accordance with another embodiment of the present invention.

FIG. 8 illustrates a schematic circuitry diagram of a constant on-time switching converter 400, in accordance with another embodiment of the present invention. The topology of the switching converter 400 is similar to that of the switching converter 300 shown in FIG. 3, it comprises a controller and a switching circuit 404. In the embodiment shown in FIG. 8, the controller comprises an on-time control circuit 401, a comparison circuit 402, a logic circuit 403, a slope compensation module 405 and an ultrasonic mode determination circuit 406. The slope compensation module 405 comprises a normal slope compensation circuit 451 and an additional slope compensation circuit 452. The normal slope compensation circuit 451 is configured to generate a normal slope compensation signal $V_{slope1}$. The additional slope compensation circuit 452 is coupled to the ultrasonic mode determination circuit 406, and is configured to generate an additional slope compensation signal $V_{slope2}$. That is to say, the slope compensation signal VSLOPE generated by the slope compensation module 405 has two parts: the normal slope compensation signal $V_{slope1}$ and the additional slope compensation signal $V_{slope2}$, it is the sum of the normal slope compensation signal $V_{slope1}$ and the additional slope compensation signal $V_{slope2}$.

The comparison circuit 402 comprises a comparator COM1. The comparator COM1 has a non-inverting input terminal, an inverting input terminal and an output terminal, wherein the non-inverting input terminal is configured to receive the sum of a reference voltage $V_{ref}$ and the slope compensation signal VSLOPE, the inverting input terminal is coupled to the output of the switching circuit 404 to receive the output voltage $U_{out}$, and the output terminal is configured to provide a comparison signal SET. In one embodiment, the slope compensation signal VSLOPE is subtracted from the output voltage $U_{out}$ instead of adding to the reference voltage $V_{ref}$.

The on-time control circuit 401 generates an on-time control signal COT to control the on-time $t_{on}$ of the high-side switch HS. In one embodiment, the on-time $t_{on}$ of the high-side switch HS is set to a constant value, or a variable value related to the input voltage $V_{in}$ and/or the output voltage $U_{out}$.

In an embodiment, the controller further comprises a zero-crossing detection circuit 408 configured to detecting the current flowing through the low-side switch LS. When the current flowing though the low-side switch LS decreases to be smaller than a current bias signal, the zero-crossing detection circuit 408 generates an enable zero-crossing detection signal ZCD to turn OFF the low-side switch LS. The current bias signal could be equals to zero, or a small signal larger than zero. In one embodiment, the low-side switch LS has on resistance, the zero-crossing detection circuit 408 is configured to receive the on voltage across the low-side switch LS, and to compare the on voltage with a predetermined bias voltage, and provides the zero-crossing detection signal ZCD based on the comparing result.

In one embodiment, the controller further comprises a minimum off-time control circuit 409 to prevent the comparison circuit 402 from being affected by the system noise. The comparison signal SET is disabled by the minimum off-time control circuit 409 during a minimum off-time $TOFF_{MIN}$. The minimum off-time control circuit 409 is well-known to the person skilled in the art and will not be described in detail.

In the embodiment shown in FIG. 8, the logic circuit 403 is coupled to the on-time control circuit 401, the comparison circuit 402, the ultrasonic mode determination circuit 406, the zero-crossing detection circuit 408 and the minimum off-time control circuit 409, the logic circuit 403 generates a high-side control signal HCTRL and a low-side control signal LCTRL based on the on-time control signal COT, the comparison signal SET, the flag signal FLAG and the zero-crossing detection signal ZCD. As shown in FIG. 8, the logic circuit 403 comprises a first AND gate 431, an RS flip-flop 432, a second AND gate 433 and OR gate 434. The first AND gate 431 has a first input terminal, a second input terminal and an output terminal, wherein the first input terminal is coupled to the output terminal of the comparison circuit 402 to receive the comparison signal SET, the second input terminal is coupled to the minimum off-time control circuit 409. The RS flip-flop 432 has a set terminal S, a reset terminal R, a first output terminal Q and a second output terminal/Q, wherein the reset terminal R is coupled to the output terminal of the on-time control circuit 401 to receive the on-time control signal COT, the set terminal S is coupled to the output terminal of the first AND gate 431. The RS flip-flop provides the high-side control signal HCTRL at the first output terminal Q. The second AND gate 433 has a first input terminal, a second input terminal and an output terminal, wherein the first input terminal is coupled to the second output terminal/Q of the RS flip-flop 432, the second input terminal is coupled to the zero-crossing detection circuit 408 to receive the zero-crossing detection signal ZCD. OR gate 434 has a first input terminal, a second input terminal and an output terminal, wherein the first input terminal is coupled to the output terminal of the second AND gate 433, the second input terminal is coupled to the ultrasonic mode determination circuit 406 to receive the flag signal FLAG. OR gate 434 provides the low-side control signal LCTRL for controlling the low-side switch LS at its output terminal.

In one embodiment, the switching converter 400 further comprises a driving circuit. The driving circuit is coupled to the logic circuit 403 to receive the high-side control signal HCTRL and the low-side control signal LCTRL, and generates driving signals to the control terminal of the high-side switch HS and the low-side switch LS for driving the two switches.

Even though the additional slope compensation signal $V_{slope2}$ is shown in FIG. 6, its value increases from zero voltage with a constant rate during the discharging of the low-side switch LS, and remains zero voltage at other times. It is appreciated that in other examples the rate of the additional slope compensation signal $V_{slope2}$ could be variable, or the rising of the additional slope compensation signal $V_{slope2}$ could be piecewise. These additional slope compensation signals can also be applied in this invention. The additional slope compensation signal can accelerate the output voltage $U_{out}$ to the reference voltage $V_{ref}$, shortens the discharge time of the low-side switch LS to be an appropriate value, then the double pulses can be prevented in the ultrasonic mode.

Additionally, even though the normal slope compensation signal $V_{slope1}$ is sawtooth wave, as shown in FIGS. 2~4 and 6, it is appreciated that in other examples the normal compensation signal $V_{slope1}$ can has other appropriate forms.

Figure 9:
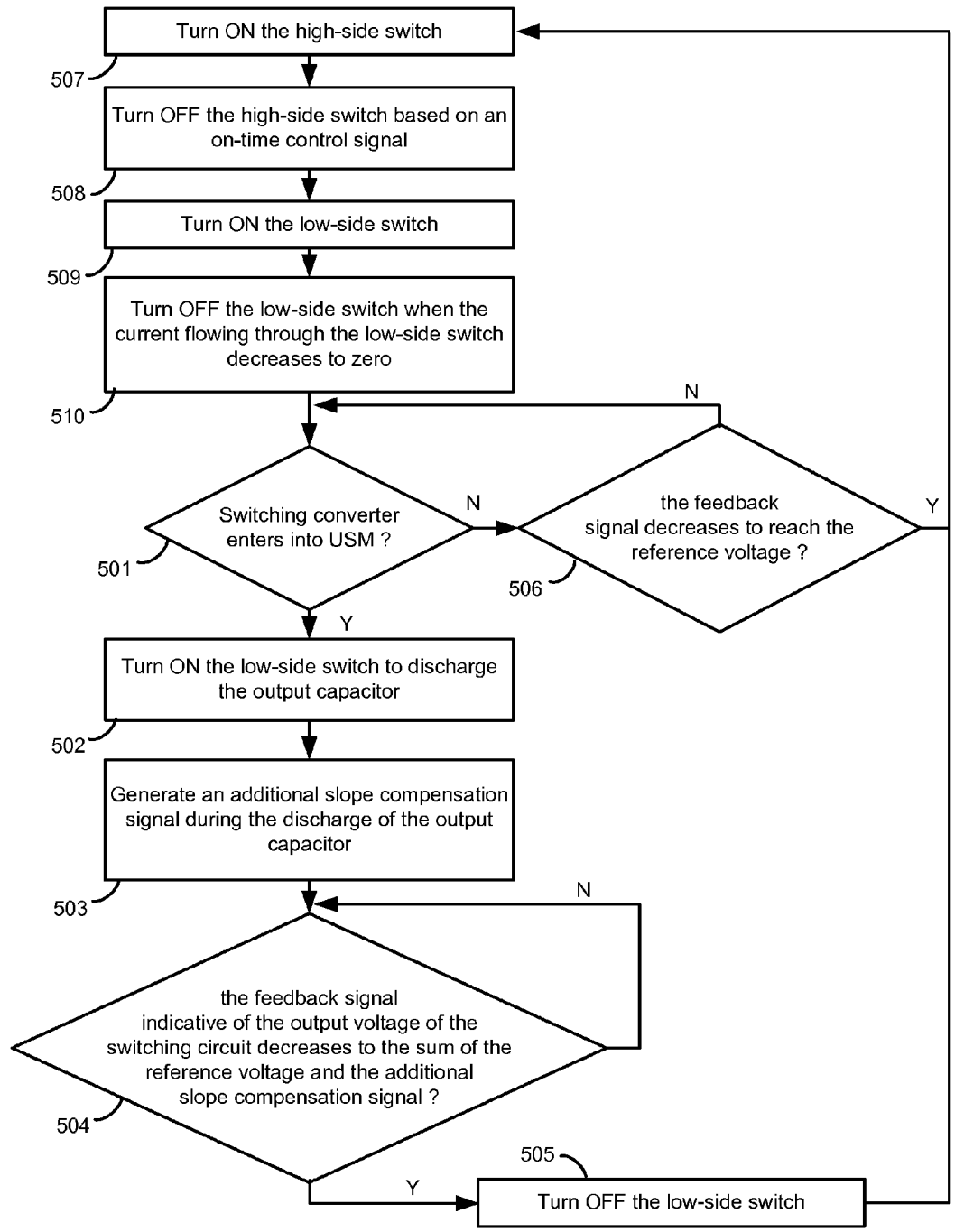
FIG. 9 illustrates a process flow diagram of a method for controlling a constant on-time switching converter, in accordance with an embodiment of the present invention.

FIG. 9 illustrates a process flow diagram of a method for controlling a constant on-time switching converter, in accordance with an embodiment of the present invention. The switching converter comprises a switching circuit having a high-side switch, a low-side switch, an inductor and an output capacitor connected in parallel with a load, wherein the switching circuit is configured to convert an input voltage into an output voltage to drive the load, the control method comprises steps S501~S510.

At step S501, whether the switching converter enters into an ultrasonic mode is judged. If the judging result is yes, go to steps S502~S505. Else, go to step S506.

At step S502, the low-side switch is turned ON to discharge the output capacitor.

At step S503, an additional slope compensation signal is generated during the discharging of the output capacitor. In one embodiment, the value of the additional slope compensation signal increases in a constant rate. In other embodiments, the value of the additional slope compensation signal increases monotonously with variable rates.

At step S504, a feedback signal indicative of the output voltage of the switching converter is compared with the sum of the additional slope compensation signal and a reference voltage to judge whether the feedback signal decrease to reach the sum of the additional slope compensation signal and the reference voltage. If the result is yes, go to step S505, else, keep judging.

At step S505, the low-side switch is turned OFF. Then go to steps S507~S510.

At step 506, the feedback signal is compared with the reference voltage to judge whether the feedback signal decreases to reach the reference voltage. If the result is yes, go to steps S507~S510, else, back to step S501.

At step S507, the high-side switch is turned ON.

At step S508, an on-time control signal for controlling the on-time of the high-side switch is generated. The high-side switch is turned OFF when the on-time of the high-side switch is over based on the on-time control signal.

At step S509, the low-side switch is turned ON.

At step S510, the low-side switch is turned OFF when the current flowing through the low-side which decreases to zero. Then return to step S501.

In one embodiment, the judging way of step S501 comprises: comparing the current switching frequency with a predetermined frequency, if the current switching frequency is smaller than the predetermined frequency, it could be deemed as the switching converter enters into the ultrasonic mode.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in a constant on-time switching converter, wherein the switching converter comprises a switching circuit having a high-side switch, a low-side switch, an inductor, and an output capacitor connected in parallel with a load, wherein the switching circuit is configured to convert an input voltage into an output voltage to drive the load, the controller comprises:
   an on-time control circuit configured to generate an on-time control signal which is used to control the on-time of the high-side switch;
   an ultrasonic mode determination circuit configured to provide a flag signal indicating whether the switching converter enters into an ultrasonic mode, wherein when the switching frequency of the switching circuit approaches an audible range, the switching converter enters into the ultrasonic mode;
   a slope compensation module coupled to the ultrasonic mode determination circuit to receive the flag signal and configured to generate a slope compensation signal based on the flag signal;
   a comparison circuit coupled to the slope compensation module and the switching circuit, wherein the comparison circuit compares a feedback signal indicative of the output voltage of the switching circuit with a sum of a reference voltage and the slope compensation signal, and generates a comparison signal; and
   a logic circuit coupled to the on-time control circuit, the comparison circuit and the ultrasonic mode determination circuit, wherein based on the on-time control signal, the comparison signal and the flag signal, the logic circuit generates a high-side control signal for controlling the high-side switch and a low-side control signal for controlling the low-side switch; wherein
   when the switching converter enters into the ultrasonic mode, the low-side switch is turned ON by the logic circuit to discharge the output capacitor until the feedback signal decreases to reach the sum of the reference voltage and the slope compensation signal, and wherein the slope compensation signal has two parts: a normal slope compensation signal and an additional slope compensation signal, wherein the additional slope compensation signal is generated during the discharge of the output capacitor to eliminate the double pulses due to the ultrasonic mode and the value of the additional slope compensation signal increases during the discharge of the output capacitor.

2. The controller of claim 1, wherein the slope compensation module comprises:
   a normal slope compensation circuit configured to generate the normal slope compensation signal; and
   an additional slope compensation circuit coupled to the ultrasonic mode determination circuit to receive the flag signal and configured to generate the additional slope compensation signal based on the flag signal.

3. The controller of claim 1, wherein the value of the additional slope compensation signal increases in a constant rate during the discharge of the output capacitor.

4. The controller of claim 1, wherein the comparison circuit comprises a comparator having a first input terminal, a second input terminal and an output terminal, wherein the first input terminal is configured to receive the sum of the reference voltage and the slope compensation signal, the second input terminal is configured to receive the feedback signal, the comparator is configured to provide the comparison signal at the output terminal.

5. The controller of claim 1, wherein the ultrasonic mode determination circuit compares the switching cycle of the switching circuit with a predetermined value, and wherein the switching converter will be deemed as entering into the ultrasonic mode if the switching cycle of the switching circuit is shorter than the predetermined value.

6. The controller of claim 3, wherein the rate of the additional slope compensation signal is larger than $t_{on}V_{out}/2LC$, wherein $t_{on}$ is the on-time of the high-side switch, $V_{out}$ is steady state output voltage of the switching circuit, L is inductance value of the inductor and C is capacitance value of the output capacitor.

7. The controller of claim 3, wherein the minimum amplitude of the additional slope compensation signal is $(V_{in}-V_{out})t_{on}^2/2LC$, wherein $t_{on}$ is the on-time of the high-side switch, $V_{in}$ is the input voltage, $V_{out}$ is steady state output voltage of the switching circuit, L is inductance value of the inductor and C is capacitance value of the output capacitor.

8. The controller of claim 6, wherein the maximum rate of the additional slope compensation signal is $t_{on}(3V_{in}+V_{out})/4LC$.

9. The controller of claim 6, wherein the minimum rate of the additional slope compensation signal is $t_{on}V_{in}/2LC$, wherein $V_{in}$ is the input voltage.

10. The controller of claim 7, wherein the maximum amplitude of the additional slope compensation signal is $t_{on}^2(V_{in}-V_{out})(3V_{in}+V_{out})/8LC\,V_{out}$.

11. A constant on-time switching converter, comprising:
   a switching circuit configured to convert an input voltage into an output voltage to drive a load, and wherein the switching circuit comprises:
      a high-side switch having a first terminal, a second terminal and a control terminal, wherein the first terminal is configured to receive the input voltage;
      a low-side switch having a first terminal, a second terminal and a control terminal, wherein the first terminal is coupled to the second terminal of the high-side switch, the second terminal is coupled to a reference ground;
      an inductor having a first terminal and a second terminal, wherein the first terminal is coupled to the second terminal of the high-side switch and the first terminal of the low-side switch, the second terminal is coupled to the load;
      an output capacitor coupled between the second terminal of the inductor and the reference ground;

an on-time control circuit configured to generate an on-time control signal which is used to control the on-time of the high-side switch;

an ultrasonic mode determination circuit configured to provide a flag signal indicating whether the switching converter enters into an ultrasonic mode, wherein when the switching frequency of the switching circuit approaches an audible range, the switching converter enters into the ultrasonic mode;

a slope compensation module coupled to the ultrasonic mode determination circuit to receive the flag signal and configured to generate a slope compensation signal based on the flag signal;

a comparison circuit coupled to the slope compensation module and the switching circuit, wherein the comparison circuit compares a feedback signal indicative of the output voltage of the switching circuit with a sum of a reference voltage and the slope compensation signal, and generates a comparison signal; and a logic circuit coupled to the on-time control circuit, the comparison circuit and the ultrasonic mode determination circuit, wherein based on the on-time control signal, the comparison signal and the flag signal, the logic circuit generates a high-side control signal to the control terminal of the high-side switch and a low-side control signal to the control terminal of the low-side switch; wherein when the switching converter enters into the ultrasonic mode, the low-side switch is turned ON by the logic circuit to discharge the output capacitor until the feedback signal decreases to reach the sum of the reference voltage and the slope compensation signal, and wherein the slope compensation signal has two parts: a normal slope compensation signal and an additional slope compensation signal, wherein the additional slope compensation signal is generated during the discharge of the output capacitor to eliminate the double pulses due to the ultrasonic mode and the value of the additional slope compensation signal increases during the discharge of the output capacitor.

12. A constant on-time control method used in a switching converter, wherein the switching converter comprises a switching circuit having a high-side switch, a low-side switch, an inductor and an output capacitor connected in parallel with a load, wherein the switching circuit is configured to convert an input voltage into an output voltage to drive the load, the control method comprises:

turning ON the high-side switch;

generating an on-time control signal;

turning OFF the high-side switch and turning ON the low-side switch based on the on-time control signal;

turning OFF the low-side switch when the current flowing through the low-side which decreases to zero;

judging whether the switching converter enters into an ultrasonic mode, wherein when the switching frequency of the switching circuit approaches an audible range, the switching converter enters into the ultrasonic mode;

turning ON the low-side switch to discharge the output capacitor when the switching converter enters into the ultrasonic mode;

generating an additional slope compensation signal during the discharge of the output capacitor to eliminate the double pulses due to the ultrasonic mode;

comparing a feedback signal indicative of the output voltage of the switching circuit with the sum of a reference voltage and the additional slope compensation signal; and turning OFF the low-side switch and turning ON the high-side switch when the feedback signal decreases to reach the sum of the reference voltage and the additional slope compensation signal.

13. The control method of claim 12, wherein the value of the additional slope compensation signal increases in a constant rate during the discharge of the output capacitor.

14. The control method of claim 12, wherein judging whether the switching converter enters into the ultrasonic mode comprises comparing the switching cycle of the switching circuit with a predetermined value, and wherein the switching converter is deemed as entering into the ultrasonic mode when the switching cycle of the switching circuit increases to reach the predetermined value.

15. The control method of claim 13, wherein the rate of the additional slope compensation signal is larger than $t_{on}V_{out}/2LC$, wherein $t_{on}$ is the on-time of the high-side switch, $V_{out}$ is steady state output voltage of the switching circuit, L is inductance value of the inductor and C is capacitance value of the output capacitor.

16. The control method of claim 13, wherein the minimum amplitude of the additional slope compensation signal is $(V_{in}-V_{out})t_{on}^2/2LC$, wherein $t_{on}$ is the on-time of the high-side switch, $V_{in}$ is the input voltage, $V_{out}$ is steady state output voltage of the switching circuit, L is inductance value of the inductor and C is capacitance value of the output capacitor.

17. The control method of claim 15, wherein the maximum rate of the additional slope compensation signal is $t_{on}(3V_{in}+V_{out})/4LC$.

18. The control method of claim 15, wherein the minimum rate of the additional slope compensation signal is $t_{on}V_{in}/2LC$, wherein $V_{in}$ is the input voltage.

19. The control method of claim 16, wherein the maximum amplitude of the additional slope compensation signal is $t_{on}^2(V_{in}-V_{out})(3V_{in}+V_{out})/8LC\,V_{out}$.

* * * * *